(12) United States Patent
Mazurek et al.

(10) Patent No.: US 6,495,188 B2
(45) Date of Patent: Dec. 17, 2002

(54) PLASTIC AND SEMISOLID EDIBLE SHORTENING PRODUCTS WITH REDUCED TRANS-FATTY ACID CONTENT

(75) Inventors: Harry Mazurek, Bala Cynwyd, PA (US); Michael R. Ferenz, Coatesville, PA (US)

(73) Assignee: ARCO Chemical Technology L.P., Greenville, DE (US)

( * ) Notice: Subject to any disclaimer, the term of this patent is extended or adjusted under 35 U.S.C. 154(b) by 30 days.

(21) Appl. No.: 09/736,719

(22) Filed: Dec. 13, 2000

(65) Prior Publication Data

US 2002/0119240 A1 Aug. 29, 2002

(51) Int. Cl.$^7$ ................................................ A23D 9/00
(52) U.S. Cl. ........................................ 426/607; 426/611
(58) Field of Search ............................... 426/601, 611, 426/607, 608

(56) References Cited

U.S. PATENT DOCUMENTS

| | | |
|---|---|---|
| 4,940,601 A | 7/1990 | Orphanos et al. |
| 4,952,687 A | 8/1990 | Bodor et al. |
| 4,959,465 A | 9/1990 | Klemann et al. |
| 4,963,396 A | 10/1990 | Klemann et al. |
| 5,017,398 A | 5/1991 | Jandacek et al. |
| 5,021,256 A | 6/1991 | Guffey et al. |
| 5,039,544 A | 8/1991 | Lansbergen et al. |
| 5,064,677 A | 11/1991 | Cain et al. |
| 5,064,678 A | 11/1991 | Klemann et al. |
| 5,096,732 A | 3/1992 | Mongeau et al. |
| 5,108,769 A | 4/1992 | Kines |
| 5,120,563 A | 6/1992 | Mohlenkamp, Jr. |
| 5,194,281 A | 3/1993 | Johnston et al. |
| 5,306,514 A | 4/1994 | Letton et al. |
| 5,306,515 A | 4/1994 | Letton et al. |
| 5,306,516 A | 4/1994 | Letton et al. |
| 5,374,438 A | 12/1994 | Yost |
| 5,589,217 A * | 12/1996 | Mazurek ..................... 426/611 |
| 5,635,236 A * | 6/1997 | Cooper ....................... 426/438 |
| 6,031,118 A * | 2/2000 | van Amerongen et al. . 426/602 |
| 6,106,886 A * | 8/2000 | van Amerongen et al. . 426/611 |
| 6,123,979 A * | 9/2000 | Hepburn et al. ............ 426/601 |
| 6,174,560 B1 * | 1/2001 | Miettenen et al. .......... 424/439 |
| 6,231,915 B1 * | 5/2001 | van Amerongen et al. . 426/602 |
| 6,352,737 B1 * | 3/2002 | Dolhaine et al. ............ 426/611 |

FOREIGN PATENT DOCUMENTS

| | | |
|---|---|---|
| EP | 0 375 027 | 6/1990 |
| EP | 0 383 380 | 8/1990 |
| EP | 0 434 150 A2 | 6/1991 |
| EP | 0571219 A2 * | 5/1993 |
| EP | 0 547 651 A1 | 6/1993 |
| EP | 0651947 A1 * | 10/1995 |
| WO | WO 94/12051 | 6/1994 |
| WO | WO 94/12052 | 6/1994 |
| WO | WO 97/21354 * | 6/1997 |
| WO | WO 97/21358 * | 6/1997 |
| WO | WO 97/22260 * | 6/1997 |
| WO | WO 97/22261 * | 6/1997 |

OTHER PUBLICATIONS

Gunstone, F. 1986. Editor, The Lipid Handbook. Chapman and Hall Ltd., New York, NY, p 23.*
Gunstone, F. 1983. Lipids in Foods. Chemistry, Biochemistry and Technology, New York, NY, p 52–56.*
Roller, S. 1996. Handbook of Fat Replacers, CRC Press, New York, NY, p. 271, 296, 297.*
Rombauer, i. 1964. Joy of Cooking, New Amierican Library, The Bobbs–Merrill Company, Inc., Indianapolis, Indiana, 508–510.*

* cited by examiner

*Primary Examiner*—Carolyn Paden
(74) *Attorney, Agent, or Firm*—Brooks & Kushman P.C.

(57) ABSTRACT

Esterified propoxylated glycerine ("EPG") may replace up to 100% of the partially hydrogenated vegetable oil content of an edible shortening product to produce a stable emulsion containing less trans-fatty acid content. A variety of shortenings may be produced, including those used for baking, frying, and as pan coatings (release agents). A butter-like product may be produced which exhibits spreading characteristics very similar to real butter.

9 Claims, No Drawings

PLASTIC AND SEMISOLID EDIBLE SHORTENING PRODUCTS WITH REDUCED TRANS-FATTY ACID CONTENT

TECHNICAL FIELD

The present invention pertains to edible shortening products such as margarine, which have a reduced trans-fatty acid content.

BACKGROUND ART

Edible shortenings were proposed many years ago as substitutes for natural products such as lard and butter. These shortenings may have a consistency ranging from creamy to hard and butter-like. Large quantities of such shortenings are sold for use in baking and as a substitute for butter. In order to be economical, edible shortenings are made from naturally occurring vegetable oils. By partially hydrogenating vegetable oils to a semi-solid or solid product, a range of "hardness" may be produced. Alternatively, non-hydrogenated vegetable oils may be blended with more fully hydrogenated, solid oils. Shortening intended as a butter substitute is a soft solid at room temperature, behavior termed "plastic" by those skilled in the art. Consumers easily discern relatively minor differences between butter and margarine, with respect to their consistency when cold and when warm, their spreadability, etc.

Hydrogenation of vegetable oils causes isomeration of non-hydrogenated cis-double bonds of unsaturated vegetable oil into their trans form. For example, oleic acid residues in triglycerides are converted into elaidic acid. Recently, trans-fatty acids have been implicated in raising the risk of heart disease by adversely affecting blood lipid levels.

The substitution of fat mimetics such as polyol fatty acid polyesters for partially hydrogenated oils has not proven totally successful. First, such mimetics frequently cause bowel discomfort. Second, the different structure of the mimetics causes difficulties in formulating shortening and margarine products which perform acceptably, and which will pass consumer scrutiny. These shortcomings are attested to in U.S. Pat. No. 5,194,281, where very specific combinations of fatty acids are employed in esterifying sucrose to form polyol fatty acid polyesters in order to produce acceptable products, and in U.S. Pat. No. 5,306,516, wherein complex formulations are necessary to prepare a product containing polyester fat mimetics.

It would be desirable to provide a substitute for all or part of the "hard" hydrogenated vegetable oil fraction of semi-solid to plastic shortening and thus lower the trans-fatty acid content of the shortening, while maintaining the desirable baking characteristics and consumer-desired consistency. It would further be desirable to offer a margarine-like product with the spreadability and other physical and organoleptic characteristics of butter, and to produce a range of products in terms of hardness, etc.

DISCLOSURE OF INVENTION

It has now been unexpectedly discovered that up to 100% of hydrogenated vegetable oils in shortening formulations may be replaced by esterified propoxylated glycerine ("EPG"). The products thus obtained have properties acceptable to the consumer. The replacement of the "hard fraction" of partially hydrogenated oil allows significant reduction of the trans-fatty acid content in vegetable oil-based shortening products.

BEST MODE FOR CARRYING OUT THE INVENTION

By the term "shortening" as used herein is meant an edible mixture of solid and liquid fats and fat mimetics, a substantial portion of the liquid fat being derived from natural sources such as corn oil, soybean oil, palm kernel oil, coconut oil, canola oil, cotton seed oil, etc. The "shortenings" are edible, any may take the form of fluffy, low density, air and water-containing soft products of the consistency of whipped butter or margarine; semi-solid "greasy" products having higher density but little or no air or moisture, such as are used for butter or lard substitution in baking or for frying; or products with the consistency of margarine or butter, having considerable water content but little air content, and ranging in consistency from soft and spreadable at room temperature or below, e.g., "soft" margarine, to solid and crumbly at room temperature, often exhibiting a "fracture" upon spreading as is observed with butter. In other words, the edible shortenings of the present invention may take all the forms and physical, chemical, and organoleptic characteristics of butter, lard, and their vegetable oil-based replacement products now commonly available in the marketplace.

By the term "fat content" is meant the total, in weight percent based on total shortening weight, of the fat constituents, including fat mimetics, of the shortening product. In margarines, for example, total fat is usually about 80% by weight of the product weight, the remaining 20% being mostly water, but also including, where necessary, emulsifiers, antioxidants, anti-spatter agents, coloring agents, flavorants, sugar, salt, proteins; odorants, nutraceuticals such as stanol fatty acid esters and/or sterol fatty acid esters, etc. Other ingredients are well known to one skilled in the art of shortening formulation. Oily antioxidants such as α-tocopherol and α-tocopherol acetate are not considered as part of the fat content of the shortening product.

By the term "partially hydrogenated vegetable oil" is meant a partially hydrogenated vegetable oil containing trans-unsaturated fatty acids. Such semisolid and solid products typically have iodine numbers above 10 and below the iodine number of the vegetable oil from which they are derived, typically below 60 and more typically in the range of 15 to 50. The greater the degree of hydrogenation, the lower the iodine number. Iodine number may be measured conventionally, i.e., by the "Wijs method" set forth in AOCS Official Method Col. 1-25.

By the term "hardstock" is meant a fully hydrogenated vegetable oil characterized by a low iodine value, and hence substantially no remaining unsaturation. Iodine values lower than 10, and in particular about 2 or less are typical. Hardstock contains few trans-unsaturated fatty acids since there is very little if any unsaturation remaining.

By "EPG" is meant esterified propoxylated glycerine. Such products have the chemical structure

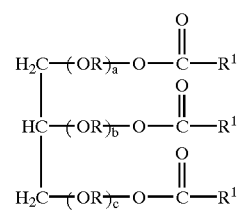

where R is

wherein $R^2$ and $R^3$ are individually selected from the group consisting of hydrogen and methyl and one of $R^2$ or $R^3$ is methyl, and $R^1$ is the hydrocarbon residue of a saturated or unsaturated carboxylic acid substantially free of trans-unsaturation. Thus, $R^1$ is a saturated or unsaturated, preferably unsaturated, hydrocarbon radical having 7–23 carbon atoms, preferably 12–23 carbon atoms, and more preferably 14–23 carbon atoms. Each $R^1$ may be individually selected, i.e., mixtures of fatty acid residues may be found in the same molecule, or some molecules may have all one type of fatty acid residue while others have all another type of fatty acid residue. Most preferably, the fatty acids are obtained from natural sources, i.e., by hydrolysis of naturally occurring fats and oils, e.g., glycerine fatty esters. Sources include animal fat, vegetable oil, etc. Some of the

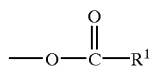

groups may be replaced by hydrogen, i.e., the EPG may have less than three acyl groups on average. A minor portion of the acyl groups may have $R^1$ which contain from 1 to 6 carbon atoms.

The degree of alkoxylation is defined as the sum of a, b, and c, where a, b, and c individually are integers from 0 to 20. In general, a, b, and c need not be equal. It has been found, for example, that when oxypropylating glycerine, a 3:1 propylene oxide/glycerine ratio (stoichiometric) will result in oxypropylation ("oxypropylation" and "propoxylation" are used synonymously) of approximately 63% of the available glycerine hydroxyl groups. Thus, the majority of molecules will have one free hydroxyl group. By employing larger amounts of propylene oxide, the number of free hydroxyls decreases. At a 4:1 propylene oxide/glycerine ratio, 82% of the hydroxyl groups are propoxylated, and at 5:1, propoxylation is complete. Preferably, the degree of propoxylation is minimally 2, more preferably at least 2.2, and most preferably in the range of 3 to 8. If the degree of propoxylation is 2.2 or more, the products will be edible but only partially digestible. For example as compared to olive oil, only 18% of the fatty acids of lower propoxylated (n=2.2) products will be liberated by pancreatic lipase. At degrees of propoxylation between 5 and 8, substantially no fatty acids will be liberated under these conditions.

Although not shown in the EPG structural formula, a most minor portion, i.e., less than 20 mol percent of the oxypropylene groups may be replaced by oxyethylene groups (e.g. both $R^2$ and $R^3$ are H). For simplicity of language, these oxyethylene group-containing alkoxylated glycerine species are also within the scope of the terms "EPG" and "esterified propoxylated glycerine" unless indicated to the contrary. The presence of oxyethylene groups changes the hydrophile/lipophile balance of the molecule, and may be present in all or part of the total EPG to adjust emulsion stability. In a similar vein, up to about 33% of the oxypropylene groups may be replaced by other oxyalkylene groups having greater hydrophobicity, i.e., 1,2-butylene oxide and 2,3-butylene oxide. The term "propoxylated" as used herein includes oxyalkylation with mixtures containing propylene oxide and minor portions, i.e., less than 50% by weight, of other alkylene oxides.

Following propoxylation, the propoxylated glycerine is esterified by conventional methods. Transesterification of propoxylated glycerine with fatty acid triglycerides may also be used. Suitable methods are disclosed, for example, in U.S. Pat. Nos. 4,983,329, 5,175,323, and 5,986,117, which are incorporated herein by reference. Catalyst removal is accomplished by standard techniques, when necessary, or may be neutralized.

A typical vegetable oil margarine is produced by forming a homogenous mixture of vegetable oil, partially hydrogenated vegetable oil and/or hardstock at elevated temperature, along with the desired amounts of water, emulsifiers, flavorants, and other additives. Typically, total fat content is about 80%. The liquid mixture is cooled rapidly with thorough agitation to form the desired, solid product. Large crystals, which tend to make the product grainy, are avoided. The actual degree of smoothness may be varied by altering the cooling rate or the rate of agitation or both. Changes in the solid/liquid fat ratio, water content, and emulsifier content may also affect the smoothness/graininess characteristics. Incorporation of air during this stage or at a later stage results in a less dense and generally softer product. Baking shortening is prepared similarly, but generally with lesser amounts of water, preferably substantially no water.

In a typical margarine formulation, the total fat will be comprised of about 50 parts vegetable oil and about 50 parts partially hydrogenated vegetable oil per 100 parts total fat. It has now been unexpectedly discovered that margarine and butter substitutes may be produced by substituting EPG for a portion, preferably at least 50% of the partially hydrogenated vegetable oil. Up to 100% preferably more than 20%, more preferably more than 30%, yet more preferably greater than 50%, and most preferably 60–90% of the partially hydrogenated vegetable oil is substituted by EPG. Hardstock may be retained in such formulations if desired, as hardstock contains substantially no trans unsaturated fatty acids. The substitution of EPG for all or a major amount of the partially hydrogenated vegetable oil also allows for a greater proportion of less expensive liquid vegetable oil to be used. Surprisingly, despite the totally different chemical structure due to the presence of oxyalkylene and polyoxyalkylene ether-linked moieties, the EPG of the present invention have been found to be compatible with vegetable oil and hydrogenated vegetable oil. Even more surprisingly, substitution of a portion of the partially hydrogenated vegetable oil content has allowed a product with a butter-like consistency to be produced. Preparation of products with butter-like consistency has been very problematic in the past, and minor differences tend to be noticed by consumers.

Typical margarine and/or shortening ingredients other than those essential to these products (fats and oils, water) are well known. In general, the formulations contain relatively low amounts of emulsifiers and compatibilizers, e.g., lecithin and Dimodan Emulsifier, oil based vitamins, e.g. vitamin A and β-carotene, and both oil soluble and water soluble flavorants. The aqueous phase may be partially composed of milk or may contain milk solids, and generally contains salt and preservative, e.g. sodium ascorbate or sodium benzoate. The oil phase ingredients and water phase ingredients are typically blended separately, then mixed together with cooling to form the product. With water-free products such as frying oils or shortenings, the additional water phase ingredients are generally omitted, but antioxidants and flavorings may still be added. Oil soluble antioxidants such as BHT are preferred in such cases.

The products may also contain nutraceuticals or pharmaceuticals, for example ingredients believed to lower cholesterol or be otherwise beneficial, such as the fatty acid esters of phytosterols or plant sterols, e.g., stanol or sterol fatty acid esters. The composition may also contain esters of ω-3 and ω-6 fatty acids, and other products believed to be "health smart."

Edible shortening compositions were prepared using conventional equipment. The fatty shortening ingredients were heated and stirred to a liquid, homogenous composition. The liquid composition was cooled with agitation in a portable Armfield votator. Past experience has shown a positive correlation between laboratory results using the Armfield votator and larger, pilot plant quantities. The control, Comparative Example C-1, contained no EPG, but instead was derived from soybean oil (L-soy) and partially hydrogenated soybean oil (H-soy). The formulations tested are presented in Table 1. The EPG is a 5 mol propoxylate of glycerin, esterified with fatty acids derived from rapeseed, soya, and/or canola oils.

EXAMPLE 1

A conventional mixing procedure is used to prepare an EPG-containing margarine product, in a batch size of 3.0 kg. The formulations of the oil and water phases is given below in weight percent.

| Ingredient | Formula Percent |
|---|---|
| Oil Phase | |
| Liquid Soy Oil | 25.1400 |
| Hard Soy Oil - 508 | 30.0000 |
| EPG Lot 900445 | 25.0000 |
| Dimodan Emulsifier | 0.1000 |
| Lecithin-Yelkin TS | 0.3000 |
| Vit A Palmitate-500,000 IU/G | 0.0071 |
| β-Carotene 15%-250,000 IU/G | 0.0025 |
| Flavor-LOL Oil Phase | 0.0100 |
| Total Oil Phase: | 80.5596 |
| Water Phase | |
| Water, RO | 7.5304 |
| Skim Milk-Lq | 10.0000 |
| Salt-Culinox 999 | 1.8000 |
| Sodium Benzoate | 0.1000 |
| Flavor-LOL Water Phase | 0.0100 |
| Total Water Phase: | 19.4404 |
| Total Batch | 100.0000 |

The water and milk are combined and pasteurized at 165° F. (74° C.) for 20 seconds, and cooled to 40–50° F. (4–10° C.). The remaining water phase ingredients are blended in with agitation. In a separate container, the liquid and solid soy oils and EPG are melted at 120–130° F. (49–54° C.) and stirred to provide a homogenous sample. Two small portions of the warm oils are reserved. One portion is blended with lecithin and added to the bulk of the warm oil with stirring, while a second portion is blended with the Dimodan Emulsifier and heated to 160° F. (71° C.) before adding to the bulk of the warm oil. The remaining oil phase ingredients are then blended in, followed by the water phase ingredients. The mixture is heated to maintain a temperature of from 105–110° F. (41–43° C.). The mixture is cooled using an Armfield votator until it starts to set, in this case 66.2° F. (19.0° C.). The mixture is then filled into 8 oz. (223 g) margarine cups and placed in a 40° F. (4.4° C.) cooler. After 12 hours, the product is tested for spreadability, penetration, and melting point. The results are tabulated below.

EXAMPLES 2–13

Comparative Example C1

In a similar fashion, a comparative margarine product not containing EPG, and twelve additional margarine products containing variable amounts of EPG, hard soy, and liquid soy are prepared. The characteristics are tabulated below.

TABLE 1

| Example | L-Soy % | H-Soy % | EPG-3 % | Total Formula Fat % |
|---|---|---|---|---|
| C1 | 40 | 40 | 0 | 80 |
| 1 | 25 | 30 | 25 | 80 |
| 2 | 20 | 25 | 35 | 80 |
| 3 | 15 | 20 | 45 | 80 |
| 4 | 10 | 15 | 55 | 80 |
| 5 | 20 | 0 | 60 | 80 |
| 6 | 15 | 0 | 65 | 80 |
| 7 | 0 | 0 | 80 | 80 |
| 8 | 25 | 10 | 45 | 80 |
| 9 | 30 | 5 | 45 | 80 |
| 10 | 35 | 0 | 45 | 80 |
| 11 | 20 | 10 | 50 | 80 |
| 12 | 25 | 5 | 50 | 80 |
| 13 | 30 | 0 | 50 | 80 |

The subjective evaluations of the products are given in Table 2 below.

TABLE 2

| Example | Color | Appearance | Emulsion Stability | Spreadability |
|---|---|---|---|---|
| C1 | Typical Margarine | Smooth Typical Margarine Satin Finish | Stable | Very soft, spreadability like soft margarine. (50° F.) |
| 1 | Typical | Smooth Typical Margarine Satin Finish | Stable | Quite spreadable, like a stick margarine. (44° F.) |
| 2 | Less-Yellow - Like Butter | Not as Smooth, Somewhat Typical Satin Finish | Stable | Somewhat spreadable, not as spreadable as Example 1 - similar to butter. Slight shattering like butter. (47° F.) |
| 3 | Typical Margarine | Not as Smooth Flat Finish Not Typical | Slight Syneresis | Highly spreadable, very much like butter. (49° F.) |
| 4 | Typical Margarine | Not as Smooth Somewhat Typical Glossy Finish | Some Syneresis | Not spreadable, crumbly - waxy. (46° F.) |

TABLE 2-continued

| Example | Color | Appearance | Emulsion Stability | Spreadability |
|---|---|---|---|---|
| 5 | More Yellow | Not as Smooth Somewhat Typical Glossy Finish | Stable | Not spreadable, shatters - crumbly. (48° F.) |
| 6 | More Yellow | Not as Smooth Somewhat Typical Glossy Finish | Stable | Not spreadable, extremely hard & waxy, shatters - crumbly. (48° F.) |
| 7 | Dirty Gray Yellow | Not as Smooth Not Margarine-like Satin Finish | Stable | Not spreadable, extremely hard & waxy, shatters - crumbly. (51° F.) |
| 8 | cream like less yellow like butter | smooth typical margarine satin finish | weak slight syneresis | Moderately firm. Slightly fracturing or shattering. Like Butter. |
| 9 | lemon yellow | smooth typical margarine satin finish | weak slight syneresis | Firm waxy, crumbly doesn't spread |
| 10 | lemon yellow | smooth non typical of margarine glossy finish | weak slight syneresis | firm waxy, crumbly doesn't spread |
| 11 | pale yellow typical margarine similar to C1 | smooth typical margarine satin finish similar to C1 | weak slight syneresis | quite hard very waxy and crumbly doesn't spread |
| 12 | pale yellow typical margarine similar to Example 11 | smooth typical margarine satin with a hint of glossy finish similar to Example 11 | weak slight syneresis | Quite hard, but not as hard as Example 11. Very waxy and crumbly |
| 13 | lemon yellow similar to Test 10 | smooth typical margarine satin with a hint of glossy finish similar to Example 11 | weak slight syneresis | Quite hard, but not as hard as Test 11. Very waxy and crumbly. Similar to Example 12. |

Table 3 gives the penetrometer results for the edible shortenings.

TABLE 3

| Test* | Penetration (AVG.) Total Cone WT: 195 Grams (mm) | @ Temp. ° C. (° F.) |
|---|---|---|
| C1 | >22.56 | 3.7–4.2 (38.6–39.7) |
| 1 | 11.4 | 3.7–4.2 (38.6–39.7) |
| 2 | 8.48 | 3.7–4.2 (38.6–39.7) |
| 3 | 5.77 | 3.7–4.2 (38.6–39.7) |
| 4 | 3.58 | 3.7–4.2 (38.6–39.7) |
| 5 | 3.60 | 3.7–4.2 (38.6–39.7) |
| 6 | 2.85 | 3.7–4.2 (38.6–39.7) |
| 7 | 0.88 | 3.7–4.2 (38.6–39.7) |
| 8 | 5.94 ± 0.63 | 3.5–5.1 (38.3–41.1) |
| 9 | 5.73 ± 0.44 | 4.0–5.2 (39.2–41.3) |
| 10 | 6.49 ± 0.60 | 3.7–4.7 (38.6–40.5) |
| 11 | 3.48 ± 0.51 | 4.1–4.8 (39.4–40.7) |
| 12 | 3.96 ± 0.33 | 3.9–4.9 (39.0–40.8) |
| 13 | 4.48 ± 0.39 | 3.7–5.4 (38.6–41.8) |

*See Table 1 for oil ratio.
**Total cone wt was 145 grams. The cone hit the bottom when 195 grams (total cone wt) was used.

As can be seen from the above, EPG can be successfully substituted for all or a major portion of partially hydrogenated soybean oil. The products prepared have not been optimized. Examples 1, 2, and 3 all proved quite acceptable as butter substitutes (margarine) after storage at room temperature. Several of the other formulations proved to be too hard for use as margarine, but would be acceptable in other baking or frying applications. Minor syneresis was reported in several formulations, but is not significantly different from several commercial products. Increase in emulsion stability and decreased syneresis may be alleviated by addition of emulsifiers.

Especially notable are Examples 2, and 3, and 8 which have a butter-like consistency which is difficult to achieve with margarine-type products prepared from vegetable oil and partially or fully hydrogenated vegetable oils. These products exhibited the typical "shattering" at 7° C. to 13° C. expected of butter when spread. The compositions also contain no fat mimetics such as sugar poyol fatty esters, which despite their general unsuitability for preparing acceptable edible products in and of themselves, may be used to modify the properties of EPG-containing products when used in small quantities, i.e., less than 10% and preferably less than 5% of total fat.

By the term "low content of trans-unsaturated fatty acids" is means a content lower than an edible shortening product containing partially hydrogenated unsaturated fatty acids in lieu of EPG.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a trans-fatty acid-containing edible solid shortening product comprising a liquid vegetable oil, a partially hydrogenated vegetable oil, and optionally a fully hydrogenated vegetable oil, the improvement comprising reducing the trans-fatty acid content of the edible shortening product by replacing a portion of the partially hydrogenated vegetable oil with an EPG of the formula comprising:

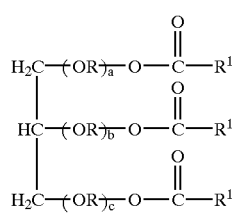

where R is

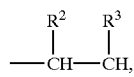

wherein $R^2$ and $R^3$ are individually selected from H and $C_{1-4}$ lower alkyl, wherein at least 50% of R contain one hydrogen and one methyl as $R^2$ and $R^3$;

wherein at least two $R^1$ on average are $C_{7-23}$ saturated or $C_{7-23}$ unsaturated aliphatic hydrocarbon radicals and wherein

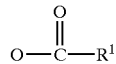

comprise carboxyl-radicals derived from a mixture of fatty acids obtained by hydrolysis of one or more naturally occurring vegetable oils, palmitic acid, stearic acid, oleic acid, linoleic acid, linolenic acid or mixtures thereof, and wherein on average, not more than one $R^1$ may also be —H or $C_{1-6}$ lower alkyl or alkenyl; and wherein a, b, and c are integers from 0 to 20, and the average of the sum of a+b+c is from 3 to about 8, said edible shortening product further comprising water in an amount up to about 20% based on the total weight of said edible shortening product.

2. The edible shortening of claim 1 wherein the weight ratio of c):b) is minimally 2:1.

3. The edible shortening of claim 1 wherein the weight ratio of c):b) is minimally 3:1.

4. The edible shortening product of claim 1, which has the consistency of butter and exhibits a slight shattering upon spreading at a temperature in the range of 7° C. to 13° C.

5. The edible shortening product of claim 1, which has the consistency of butter and exhibits a slight shattering upon spreading at a temperature in the range of 7° C. to 13° C.

6. The edible shortening product of claim 1 comprising about 20% water.

7. The edible shortening product of claim 1, further comprising one or more of a flavorant, an odorant, a dye, an emulsifier, an anti-spatter agent, a plasticizer, an antioxidant, nutraceuticals, or entrained gas.

8. The edible shortening product of claim 1, wherein said vegetable oil includes stanol fatty acid esters and/or sterol fatty acid esters.

9. The product of claim 1, wherein said naturally occurring vegetable oils are selected from the group consisting of soybean oil, corn oil, palm kernel oil, coconut oil, canola oil, cottonseed oil, or mixtures thereof.

* * * * *